(12) United States Patent
Osgood

(10) Patent No.: US 6,213,608 B1
(45) Date of Patent: Apr. 10, 2001

(54) TRAILER HITCH ALIGNMENT MIRROR

(75) Inventor: Alan George Osgood, Redmond, WA (US)

(73) Assignee: Evergreen Innovations, L.L.C., Carnation, WA (US)

( * ) Notice: Subject to any disclaimer, the term of this patent is extended or adjusted under 35 U.S.C. 154(b) by 0 days.

(21) Appl. No.: 09/435,501

(22) Filed: Nov. 6, 1999

(51) Int. Cl.[7] ................. G02B 7/182; B60R 1/06
(52) U.S. Cl. .............. 359/841; 359/872; 359/881; 33/264; 248/480; 248/485; 280/477
(58) Field of Search ................. 359/841, 872, 359/881; 33/264; 280/477; 248/479, 480, 481, 484, 485

(56) References Cited

U.S. PATENT DOCUMENTS

| | | |
|---|---|---|
| D. 329,631 * | 9/1992 | Cameron . |
| D. 344,485 * | 2/1994 | Linne et al. . |
| 2,413,894 * | 1/1947 | Sorensen . |
| 2,573,443 * | 10/1951 | Holland . |
| 3,295,914 | 1/1967 | Dietrich . |
| 3,377,117 * | 4/1968 | Biscow . |
| 3,670,423 * | 6/1972 | Leber . |
| 3,767,292 * | 10/1973 | Rutkowski . |
| 3,858,966 | 1/1975 | Lowell, Jr. . |
| 4,163,606 | 8/1979 | Granno . |
| 4,621,432 * | 11/1986 | Law . |
| 4,627,634 * | 12/1986 | Coleman . |
| 4,905,376 | 3/1990 | Neeley . |
| 4,925,287 | 5/1990 | Lord et al. . |
| 4,936,669 | 6/1990 | Wun . |
| 4,951,913 | 8/1990 | Quesada . |
| 5,111,342 | 5/1992 | Quesada . |
| 5,113,588 * | 5/1992 | Walston . |
| 5,180,182 | 1/1993 | Haworth . |
| 5,235,468 | 8/1993 | Stephens . |
| 5,309,289 | 5/1994 | Johnson . |
| 5,328,199 * | 7/1994 | Howe ................. 280/477 |
| 5,478,101 | 12/1995 | Roberson . |
| 5,482,310 | 1/1996 | Staggs . |
| 5,550,681 | 8/1996 | Mazarac . |
| 5,625,500 | 4/1997 | Ackerman . |
| 5,657,175 | 8/1997 | Brewington . |
| 5,784,213 | 7/1998 | Howard . |
| 5,825,564 | 10/1998 | Mazarac . |
| 5,971,555 | 10/1999 | Wilcox et al. . |
| 6,076,847 * | 6/2000 | Thornton ................. 359/872 |

FOREIGN PATENT DOCUMENTS

2601527  * 7/1977 (DE) .

* cited by examiner

Primary Examiner—Ricky D. Shafer

(57) ABSTRACT

A viewing mirror device to assist a vehicle driver when connecting the vehicle to a trailer. The mirror device comprises a viewing mirror, an attachment tube or channel for attaching the device to the vehicle hitch, and a mast that connects the viewing mirror to the attachment tube or channel. The position of the viewing mirror can be adjusted so that the vehicle driver can see both the vehicle hitch connection point and the trailer tongue connection point in the mirror.

8 Claims, 2 Drawing Sheets

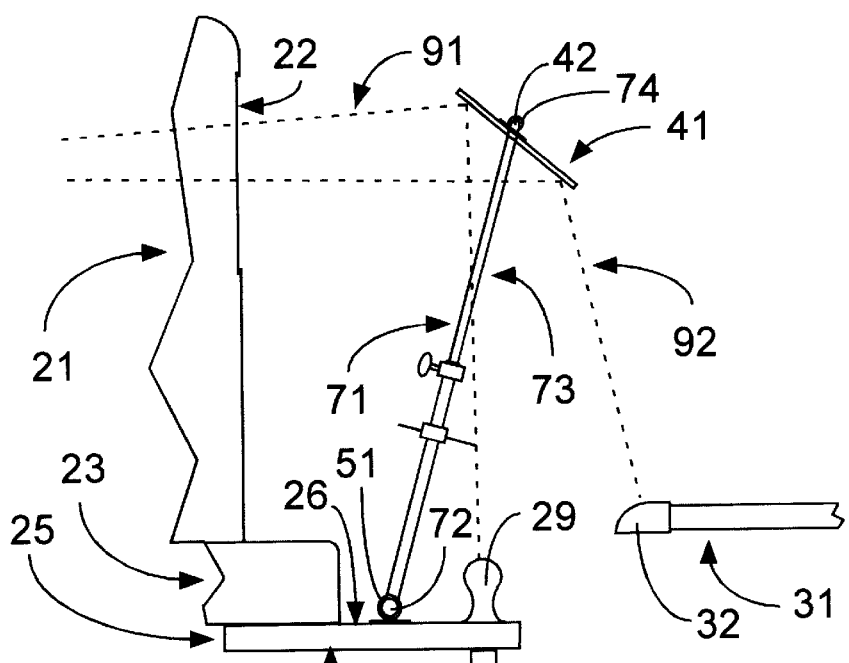
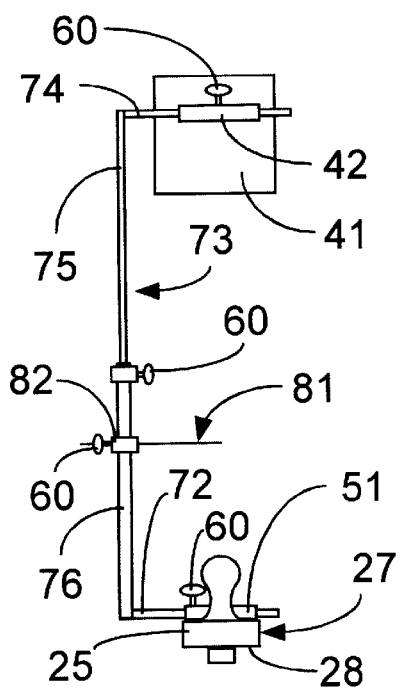
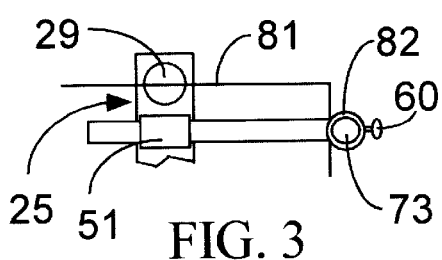
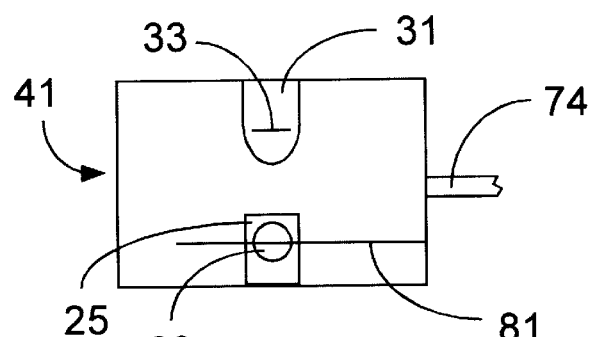

TRAILER HITCH ALIGNMENT MIRROR

CROSS-REFERENCE TO RELATED APPLICATIONS

Not applicable

STATEMENT REGARDING FEDERALLY SPONSORED RESEARCH OR DEVELOPMENT

Not applicable

REFERENCE TO A MICROFICHE APPENDIX

Not applicable

BACKGROUND OF THE INVENTION

1. The Field of the Invention

The present invention relates to a vehicle hitch viewing mirror device where the mirror device can be attached to the vehicle hitch in a manner to provide the driver of the vehicle a view of the hitch connection point and the connection point on the tongue of a trailer.

2. The Prior Art

A common way of connecting a trailer to a towing vehicle is by engaging a single connection point on the trailer with a single connection point on the towing vehicle. The connection point on the towing vehicle is typically a ball mounted on a hitch at the rear of the vehicle. The connection point on the trailer is typically a socket towards the front end of the trailer tongue. To make the connection between the trailer and the towing vehicle, the trailer tongue is elevated so that the socket is somewhat higher than the vehicle hitch ball. The vehicle is then backed up until the vehicle hitch ball is positioned directly under the trailer socket. Finally the trailer tongue is lowered over the vehicle hitch ball to make the connection. Normally the driver does not have a direct view of the vehicle hitch ball and the trailer tongue socket while backing up the vehicle. This makes unaided connection of a trailer to a tow vehicle difficult. Numerous devices have been invented to allow the driver to view the vehicle hitch connection point and the trailer connection point while backing up the vehicle. U.S. Pat. No. 3,295,914 (Dietrich); U.S. Pat. No. 4,163,606 (Granno), U.S. Pat. No. 5,235,468 (Stephens); and U.S. Pat. No. 5,309,289 (Johnson) disclose devices where a viewing mirror is mounted on the trailer. These devices only provide the driver a view of the vehicle hitch connection point when the front to back center line of the vehicle is aligned laterally with the front to back center line of the trailer. This is often not the case when the driver is backing up the tow vehicle. Therefore these devices are of only limited assistance to a driver.

U.S. Pat. No. 3,858,966 (Lowell, Jr.) discloses a device with a viewing mirror that is attached to both the towing vehicle and the trailer. This device is complicated to fabricate and use.

A device that attaches a viewing mirror to the side of the tow vehicle is disclosed in U.S. Pat. No. 4,936,669 (Wun). This device is of limited usage in attempting to determine the lateral alignment of the tow vehicle hitch connection point and the trailer tongue connection point.

U.S. Pat. No. 4,905,376 (Neely); U.S. Pat. No. 5,180,182 (Haworth); and U.S. Pat. No. 5,657,175 (Brewington) disclose devices where a viewing mirror is mounted on the tailgate of a pickup truck used as a tow vehicle. The devices provide a view from above of the truck hitch connection point regardless of the alignment of the truck front to back centerline and the trailer front to back centerline. However, the devices are not readily usable for other types of vehicles such as cars and sport utility vehicles.

Several devices have been invented which use suction cups to attach a viewing mirror to the towing vehicle. These devices are disclosed in U.S. Pat. No. 4,925,287 (Lord et al.); U.S. Pat. No. 4,951,913 (Quesada); U.S. Pat. No. 5,111,342 (Quesada); U.S. Pat. No. 5,550,681 (Mazarac); U.S. Pat. No. 5,625,500 (Ackerman); U.S. Pat. No. 5,784,213 (Howard); U.S. Pat. No. 5,825,564 (Mazarac); and U.S. Pat. No. 5,971,555 (Wilcox et al.) These devices share a common problem in that suction cups do not adhere well to rough or dirty surfaces. They are prone to moving about on, or even falling off, the tow vehicle. Also the viewing mirrors have to be aligned each time the devices are installed. Also, some of these devices are complicated to fabricate and use.

U.S. Pat. No. 5,478,101 (Roberson) and U.S. Pat. No. 5,482,310 (Staggs) disclose devices which use magnets to attach a viewing mirror to the towing vehicle. These devices tend to have the same problems and limitations as the devices that use suction cups to attach a viewing mirror to the towing vehicle.

An object of the present invention is to provide a simple way to use a viewing mirror to assist in connecting a variety of tow vehicles to a trailer.

BRIEF SUMMARY OF THE INVENTION

The viewing mirror device of the present invention comprises a mirror for viewing the tow vehicle hitch connection point and the trailer tongue connection point; a tube or channel for connecting the device to the tow vehicle hitch; and a mast for controlling the position and alignment of the mirror relative to the hitch connection point.

BRIEF DESCRIPTION OF THE SEVERAL VIEWS OF THE DRAWINGS

FIG. 1 is a view from the side of a vehicle of the mirror device attached to a vehicle extended trailer hitch FIG. 2 is a view from behind a vehicle of the mirror device attached to the vehicle extended trailer hitch FIG. 3 is a view from above showing the alignment sight FIG. 4 is a view of the trailer hitch and the trailer tongue as seen in the mirror

REFERENCE NUMERALS IN FIGURES

Figure 5:
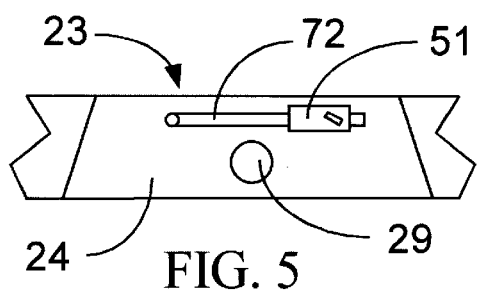
FIG. 5 is a view from above showing the trailer hitch section of a vehicle rear bumper

21—tow vehicle
22—tow vehicle rear window
23—tow vehicle rear bumper
24—tow vehicle rear bumper hitch section
25—tow vehicle extended hitch
26—tow vehicle extended hitch top surface
27—tow vehicle extended hitch side surface 28—tow vehicle extended hitch bottom surface
29—tow vehicle hitch ball
31—trailer tongue
32—trailer tongue socket
33—trailer tongue alignment mark
41—viewing mirror
42—viewing mirror attachment tube
44—mirror connecting ball
45—mirror attachment tube ball encompassing clamp
51—hitch attachment tube
53—hitch attachment clamp
54—hitch attachment clamp fixed upper horizontal section
55—hitch attachment clamp fixed vertical section
56—hitch attachment clamp fixed lower horizontal section
57—hitch attachment clamp moveable horizontal section
59—hitch attachment channel
60—adjustment screw
71—mast
72—mast bottom horizontal section
73—mast vertical section
74—mast top horizontal section
75—mast vertical section inner shaft
76—mast vertical section outer tube
81—alignment sight
82—alignment sight clamp
91—driver's line of sight to the tow vehicle hitch
92—driver's line of sight to the trailer tongue

DETAILED DESCRIPTION OF THE INVENTION

Reference is now made to the drawings wherein like parts are designated with like numerals throughout.

FIG. 1 is a view of the first embodiment of the mirror device of the present invention attached to a vehicle extended trailer hitch 25. The view is from the side of a tow vehicle 21 The extended vehicle trailer hitch 25 is located immediately below the vehicle rear bumper 23. The tow vehicle hitch ball 29, which is the tow vehicle connection point, is located towards the end of the vehicle extended trailer hitch 25. The hitch attachment tube 51 is permanently attached to the extended vehicle trailer hitch top surface 26. The mast 71 of the mirror device extends from the hitch attachment tube 51 to the mirror 41. The inside diameter of the hitch attachment tube 42 is slightly larger than the outside diameter of the mast bottom horizontal section 72. The mast bottom horizontal section 72 is inserted into the hitch attachment tube 51. The mast vertical section 73 extends upward. The mast top horizontal section 74 is connected to the mirror attachment tube 42. The trailer tongue 31 is behind the tow vehicle hitch ball 29. The trailer tongue socket 32 is positioned behind and above the tow vehicle hitch ball 29. The driver's line of sight to the tow vehicle hitch 91 passes through the tow vehicle rear window 22 to the viewing mirror 41 and down the tow vehicle hitch ball 29. Likewise the driver's line of sight to the trailer tongue 92 passes through the tow vehicle rear window 22 to the viewing mirror 41 and down to the trailer tongue socket 32.

FIG. 2 is a view from behind the mirror device when it is attached to the tow vehicle extended trailer hitch 25. The hitch attachment tube 51 is permanently attached to the vehicle extended hitch 25. The mast bottom horizontal section 72 extends through the hitch attachment tube 51. The mast bottom horizontal section 72 may be slid left or right through the hitch attachment tube 51 to adjust the left to right position of the mast vertical section 73. The mast bottom horizontal section 72 may be rotated within the hitch attachment tube 51 to adjust the fore and aft position of the top of the mast vertical section 73. An adjustment screw 60 penetrates the hitch attachment tube 51 and engages the mast bottom horizontal section 72. This secures the position of the mast bottom horizontal section 72 relative to the hitch attachment tube 51. An adjustment screw 60 penetrates the hitch attachment tube 51. This secures the position of the mast bottom horizontal section 72 in the hitch attachment tube 51.

The mast vertical section 73 comprises a mast vertical section inner shaft 75 and a mast vertical section outer tube 76. The mast vertical section inner shaft 75 telescopically engages inside the mast vertical section outer tube 76. This provides means for viewing mirror 41 to be raised or lowered relative to tow vehicle rear window. An adjustment screw 60 penetrates the mast vertical section outer tube 76 and engages the mast vertical section inner shaft 75. This secures the position of the mast vertical section inner shaft 75.

The mirror attachment tube 42 is permanently attached to the back side of the viewing mirror 41. The inside diameter of the mirror attachment tube 42 is slightly larger than the outside diameter of the mast top horizontal section 74. The mast top horizontal section 74 extends through the mirror attachment tube 43. The mirror attachment tube 42 may be slid left or right over the mast top horizontal section 74 to adjust the left to right position of the viewing mirror 41. The mirror attachment tube 42 may be rotated around the mast top horizontal section 74 to raise or lower the driver's line of sight to the tow vehicle hitch 91 and the driver's line of sight to the trailer tongue 92. An adjustment screw 60 penetrates the mirror attachment tube 42 and engages the mast top horizontal section 74. This secures the position of the mirror 41 on the mast top horizontal section 74.

FIG. 3 shows the alignment sight 81. The alignment sight 81 extends horizontally out from the alignment sight clamp 82 on the mast vertical section 73 as shown in FIG. 2. The alignment sight 81 is positioned in the driver's line of sight to the tow vehicle hitch ball 29. An adjustment screw 60 penetrates the alignment sight clamp 82 and engages the alignment sight 81. This secures the position of the alignment sight 81 relative to the tow vehicle hitch ball 29.

FIG. 4 shows the driver's view of the tow vehicle hitch ball 29 and the trailer tongue socket 32 in the viewing mirror 41. The trailer tongue alignment mark 33 is located on the top surface of the trailer tongue socket 32 directly over the point where the center of the tow vehicle hitch ball 29 is located when the trailer tongue socket is properly engaged with the tow vehicle hitch ball. When the alignment sight 81, as seen in the viewing mirror, is directly over the trailer tongue alignment mark 33, the tow vehicle connection point is aligned fore and aft with the trailer connection point.

To use the present invention first the hitch attachment tube 51 is positioned on the tow vehicle extended hitch 25 perpendicular to the front to rear tow vehicle centerline. Next, the hitch attachment tube 51 is secured to the tow vehicle trailer hitch by means of adhesive, weld or fasteners. The mirror device is mounted to the tow vehicle trailer hitch and adjusted as follows: The mast bottom horizontal section 72 is inserted into the hitch attachment tube 51. The mast 71 is adjusted so that the viewing mirror 41 is positioned over the tow vehicle connection point (tow vehicle hitch ball 29). The hitch attachment tube adjustment screw 52 is tightened to secure the position of the mast 71. The mast vertical section 73 is adjusted so that the viewing mirror 41 is visible to the driver in the vehicle rear view mirror. An adjustment screw 60 is tightened to secure the position of the mast 71. The viewing mirror 41 is adjusted so that the driver's line of sight to the tow vehicle hitch 91 is centered left to right towards the top of the viewing mirror 41. The mirror attachment tube adjustment screw 43 is tightened to secure the position off the viewing mirror 41. The alignment sight 81 is adjusted so that it appears over the center of the tow vehicle hitch ball 29 in the driver's line of sight to the tow vehicle hitch 91. Then, the driver backs the tow vehicle 21 towards the trailer tongue 31 until the trailer tongue socket 32 is visible in the viewing mirror 41. The driver maneuvers the tow vehicle left or right as needed to align the tow vehicle hitch ball 29 laterally with the trailer tongue socket 32. The driver backs the tow vehicle until the alignment sight 81 is directly over the trailer tongue alignment mark 33. The driver can then lower the trailer tongue socket 32 onto the tow vehicle hitch ball 29 and secure the trailer to the tow vehicle.

Figure 6:
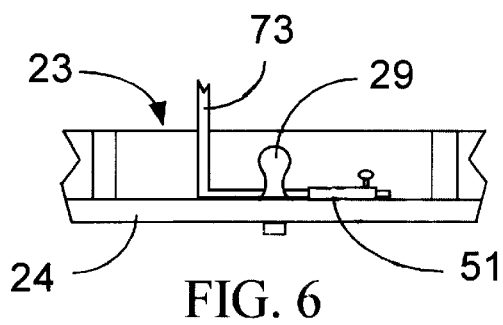
FIG. 6 is a view from behind showing the trailer hitch section of a vehicle rear bumper

FIGS. 5 and 6 show a tow vehicle rear bumper hitch section 24 that is integral to the tow vehicle rear bumper 23. The hitch attachment tube 51 is attached to the tow vehicle rear bumper hitch section 24 to one side of the tow vehicle hitch ball 29 so as to facilitate inserting and adjusting the mast bottom horizontal section 72 into the hitch attachment tube 51.

Figure 7:
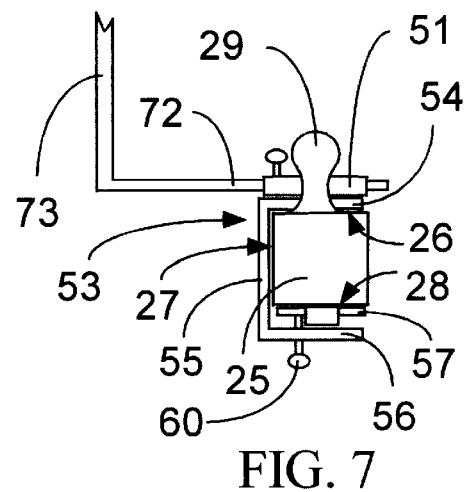
FIG. 7 shows the hitch attachment clamp attached to a vehicle extended trailer hitch

An alternate means of attaching the hitch attachment tube 51 to the tow vehicle extended hitch 25 is shown in FIG. 7. A hitch attachment clamp 53 is removeably attached to the vehicle extended hitch 25. The hitch attachment clamp fixed upper horizontal section 54 is positioned directly above the tow vehicle extended hitch top surface 26. The hitch attachment clamp fixed vertical section 55 is positioned adjacent to the tow vehicle extended hitch side surface 27. The hitch attachment clamp moveable horizontal section 57 is positioned directly below the tow vehicle extended hitch bottom surface 28. An adjustment screw 60 penetrates the hitch attachment fixed lower horizontal section 56. The adjustment screw 60 is tightened against the hitch attachment clamp moveable horizontal section 57. This creates pressure between the hitch attachment clamp moveable horizontal section 57 and the tow vehicle extended hitch bottom surface 28. It also creates pressure between the hitch attachment clamp fixed upper horizontal section 54 and the tow vehicle extended hitch top surface 26. The pressure between the hitch attachment clamp 53 and the tow vehicle extended hitch 25 secures the hitch attachment clamp 53 to the tow vehicle extended hitch 25.

Figure 8:
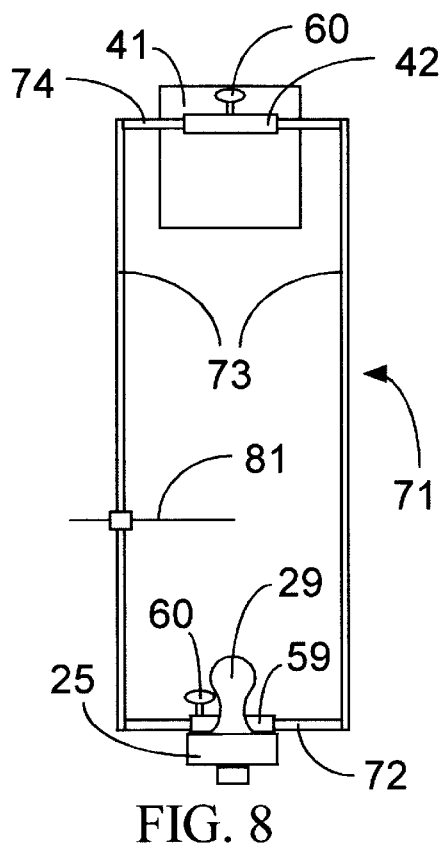
FIG. 8 is a view from behind of the mirror device showing a mast with two vertical sections
Figure 9:
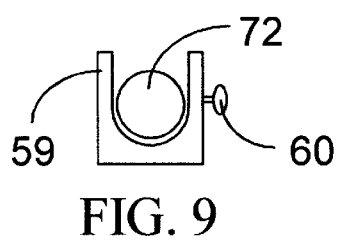
FIG. 9 is a view from the end of the hitch attachment channel

An alternate embodiment of the mast is shown in FIGS. 8 and 9. As shown in FIG. 9, the mast 71 of this alternate embodiment is a single piece. It has two mast vertical sections 73. The mast vertical sections 73 are of fixed length. The lengths of the mast vertical sections 73 are fabricated for a particular type of vehicle such as a sports utility vehicle. An open hitch attachment channel 59 as shown in FIG. 9 replaces the hitch attachment tube 51 of the first embodiment. The inside cross section of the hitch attachment channel 59 is slightly larger than the outside diameter of the mast bottom horizontal section 72. The mast bottom horizontal section 72 is lifted in and out of the hitch attachment channel 59. An adjustment screw 60 secures the position of the mast bottom horizontal section 72 in the hitch attachment channel 59.

Figure 10:
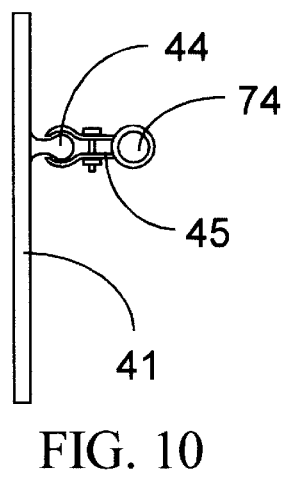
FIG. 10 shows the mirror ball and ball encompassing clamp

An alternate attachment system for the viewing mirror 41 is shown in FIG. 10. A mirror connecting ball 44 is attached to the back side of the viewing mirror 41. A mirror connecting ball encompassing clamp 45 replaces the mirror attachment tube 42. The mirror connecting ball 44 can be rotated within the mirror connecting ball encompassing clamp 45 so as to allow the viewing mirror X to be rotated around a vertical axis. This allows the mirror device to be mounted to one side of the tow vehicle front to back centerline. The mirror device can therefore be used on tow vehicles in which the driver's line of sight to the tow vehicle hitch 91 is blocked in the center of the vehicle.

I claim:

1. A mirror device for aligning a ball of a tow vehicle trailer hitch with a socket of a trailer tongue, comprising:

a mirror, a mast, and a hitch attachment tube;

said hitch attachment tube is attached to the tow vehicle trailer hitch;

said mast comprises a mast bottom horizontal section and a mast vertical section;

said mast bottom horizontal section is inserted into and secured to the hitch attachment tube; and said mast vertical section is attached to said mirror.

2. The mirror device of claim 1 wherein the hitch attachment tube is attached directly to the tow vehicle trailer hitch by means of weld, adhesive, composite material or fasteners.

3. The mirror device of claim 1 wherein the hitch attachment tube is attached to the trailer hitch by means of a hitch attachment clamp comprising:

a hitch attachment clamp fixed upper horizontal surface for securing the hitch attachment clamp to the top surface of the vehicle trailer hitch;

a hitch attachment clamp fixed vertical surface for securing the hitch attachment clamp fixed vertical surface to one side surface of the vehicle trailer hitch;

a hitch attachment clamp movable horizontal surface for securing the hitch attachment clamp movable horizontal surface to the bottom surface of the vehicle trailer hitch;

a hitch attachment clamp fixed lower horizontal section; and a hitch attachment clamp adjustment screw for adjusting the distance from the hitch attachment clamp movable horizontal surface to the hitch attachment clamp fixed lower horizontal section.

4. The mirror device of claim 1 wherein the mast vertical section comprises a mast vertical section inner shaft, a mast vertical section outer tube, and a means for securing the position of said mast vertical section inner shaft to said mast vertical section outer tube;

the mast vertical section outer tube having an inside diameter slightly larger than the diameter of the mast vertical section inner shaft;

the mast vertical section inner shaft is inserted into the mast vertical section outer tube; and said means for securing the position of the mast vertical section inner shaft to the mast vertical section outer tube secures the mast vertical section inner shaft to the mast vertical section outer tube.

5. A mirror device for aligning a ball of a tow trailer vehicle hitch with a socket of a trailer tongue, comprising:

a mirror, a mast, and a hitch attachment channel;

said hitch attachment channel is attached to the tow vehicle trailer hitch;

said mast comprises a mast bottom horizontal section and a mast vertical section;

said mast bottom horizontal section is inserted into and secured to the hitch attachment channel; and said mast vertical section is attached to said mirror.

6. The mirror device of claim 1 wherein the hitch attachment channel is attached directly to the tow vehicle trailer hitch by means of weld, adhesive, composite material or fasteners.

7. The mirror device of claim 1 wherein the hitch attachment channel is attached to the trailer hitch by means of a hitch attachment clamp comprising:

- a hitch attachment clamp fixed upper horizontal surface for securing the hitch attachment clamp to the top surface of the vehicle trailer hitch;
- a hitch attachment clamp fixed vertical surface for securing the hitch attachment clamp fixed vertical surface to one side surface of the vehicle trailer hitch;
- a hitch attachment clamp movable horizontal surface for securing the hitch attachment clamp movable horizontal surface to the bottom surface of the vehicle trailer hitch;
- a hitch attachment clamp fixed lower horizontal section; and
- a hitch attachment clamp adjustment screw for adjusting the distance from the hitch attachment clamp movable horizontal surface to the hitch attachment clamp fixed lower horizontal section.

8. The mirror device of claim 5 wherein the mast vertical section comprises a mast vertical section inner shaft, a mast vertical section outer tube, and a means for securing the position of said mast vertical section inner shaft to said mast vertical section outer tube;

- the mast vertical section outer tube having an inside diameter slightly larger than the diameter of the mast vertical section inner shaft;
- the mast vertical section inner shaft is inserted into the mast vertical section outer tube; and
- said means for securing the position of the mast vertical section inner shaft to the mast vertical section outer tube secures the mast vertical section inner shaft to the mast vertical section outer tube.

* * * * *

UNITED STATES PATENT AND TRADEMARK OFFICE
CERTIFICATE OF CORRECTION

PATENT NO. : 6,213,608 B1
DATED : April 10, 2001
INVENTOR(S) : Alan George Osgood It is certified that error appears in the above-identified patent and that said Letters Patent is hereby corrected as shown below:

<u>Column 7,</u>
Line 1, change "claim 1" to -- claim 5 --.
Line 5, change "claim 1" to -- claim 5 --.

Signed and Sealed this

Nineteenth Day of February, 2002

Attest:

JAMES E. ROGAN
*Attesting Officer*    *Director of the United States Patent and Trademark Office*